United States Patent [19]

Hsiung

[11] Patent Number: 4,580,972

[45] Date of Patent: Apr. 8, 1986

[54] HEATING APPARATUS AND METHOD

[76] Inventor: Yen W. Hsiung, 01-08 Chia Ping Road, Singapore, Singapore

[21] Appl. No.: 649,279

[22] Filed: Sep. 11, 1984

[30] Foreign Application Priority Data

Sep. 12, 1983 [GB] United Kingdom ............... 8324359

[51] Int. Cl.[4] .................... F27D 5/00; C21D 1/62; F24F 9/00; F27B 15/00
[52] U.S. Cl. .................................. 432/10; 266/134; 432/64; 432/197; 432/225
[58] Field of Search .............. 432/9, 10, 64, 197, 432/225, 231, 242; 266/134

[56] References Cited

U.S. PATENT DOCUMENTS

| | | | |
|---|---|---|---|
| 1,117,401 | 11/1914 | Klone | 432/225 |
| 3,186,698 | 1/1965 | Thome | 432/64 |
| 4,203,721 | 5/1980 | Hayes et al. | 432/10 |
| 4,204,823 | 5/1980 | Hayes et al. | 425/393 |
| 4,437,453 | 3/1984 | Temple et al. | 432/225 |

FOREIGN PATENT DOCUMENTS

| | | |
|---|---|---|
| 2536100 | 2/1977 | Fed. Rep. of Germany . |
| 2536306 | 2/1977 | Fed. Rep. of Germany . |
| 651097 | 3/1951 | United Kingdom . |
| 725192 | 3/1955 | United Kingdom . |
| 918683 | 2/1963 | United Kingdom . |
| 987724 | 3/1965 | United Kingdom . |
| 1045887 | 10/1966 | United Kingdom . |
| 1210950 | 11/1970 | United Kingdom . |
| 1218548 | 1/1971 | United Kingdom . |
| 1349679 | 4/1974 | United Kingdom . |
| 1499393 | 2/1978 | United Kingdom . |

*Primary Examiner*—John J. Camby
*Attorney, Agent, or Firm*—Bacon & Thomas

[57] ABSTRACT

Apparatus for heating a plastic pipe 18 or the like comprises a body portion having inner and outer parts 1,2 defining therebetween an annular cavity 3 which receives the end of the pipe. In use of the apparatus, hot fluid is pumped through the cavity 3 via flow passages 7-11 whereby to heat the pipe 18 sufficiently e.g. for moulding purposes. The fluid is prevented from escaping from the open end of the cavity 3 by means of compressed air supplied via ports 15.

9 Claims, 4 Drawing Figures

HEATING APPARATUS AND METHOD

This invention relates to apparatus for heating plastic pipes, tubes or the like whereby the plastic is heated sufficiently to become malleable for moulding purposes.

It is often necessary to mould plastic pipes and other tubular fittings; for example one end portion of a pipe is often enlarged to enable mating interengagement with the unenlarged end portion of a like pipe, and the enlarged end portion is formed by moulding on a socket die. Prior to moulding, it is necessary to heat the plastic so that it becomes malleable, and previously this has been achieved for example by immersing the portion of the pipe to be moulded, generally the end portion, in a bath of hot fluid such as oil. This method of heating has the advantage that the temperature of the fluid may easily be held at an appropriate value such that overheating and burning of the plastic is avoided, and furthermore the plastic reaches the desired temperature quickly. However, immersing pipes and tubes in a fluid bath is inconvenient and can present particular difficulties where large pipe, which may be six metres or more in length, are concerned.

An alternative method for heating plastic pipes and tubes involves introducing the part to be moulded into a hot air chamber. This method reduces the handling difficulties associated with dipping pipes or tubes into a hot fluid bath, although the use of a hot air chamber results in high energy consumption and furthermore the pipe is only heated up relatively slowly and the system is therefore time consuming.

According to the invention there is provided heating apparatus for plastic pipes, tubes or the like, comprising a body portion and an annular cavity defined in said body portion and having an open end adapted to receive a part of a pipe or the like, the cavity being communicable with a source of hot fluid whereby in use fluid is caused to flow through the cavity in intimate contact with the pipe so as to heat said part of the pipe or the like, disposed therein.

The fact that in accordance with the invention fluid is caused to flow through the cavity in intimate contact with the pipe is advantageous in that a relatively small quantity of fluid may be recirculated through the cavity and the size of the fluid source or reservoir may be minimised with resulting energy saving. A bath of fluid in which the pipe is immersed is not required, and the handling difficulties encountered heretofore do not arise.

The fluid used in accordance with the invention will normally be a liquid such as oil.

Preferably the manner in which the cavity is communicable with a source of hot fluid is such that in use the fluid is quickly and evenly distributed along its length such that rapid and even heating of the pipe is achieved. Thus, in a preferred embodiment the body portion includes fluid flow passages which communicate with both the inner and outer walls of the cavity at spaced intervals along its length and which are conectable to one or more hot fluid inlet lines of the apparatus. Hot fluid pumped into the apparatus via such flow passages thus impinges on both the inner and outer surfaces of the part of a pipe disposed within the cavity. One or more fluid outlet openings may be provided from the cavity, and as mentioned above if desired the hot fluid may be continuously recirculated to and from the apparatus from a suitable reservoir such that energy consumption is minimised.

A preferred embodiment of the invention is adapted to heat the end portion of a pipe or tube, and one end of the cavity is therefore closed. Fluid outlet openings may conveniently be formed adjacent the closed end of the cavity such that in use the hot fluid flows in a direction away from the open end of the cavity. It will be appreciated that sealing means adjacent the open end of the cavity are required to prevent the hot fluid escaping and contacting parts of the pipe outside the cavity. Resilient mechanical seals adapted for sealing engagement with the inner and outer surfaces of the pipe might conceivably be provided. However, in a particularly advantageous embodiment compressed air is forced into the cavity via openings in its inner and outer walls adjacent its open end. This prevents oil escaping and has the advantage that adequate sealing may be achieved with pipes and tubes of varying thicknesses, e.g. caused by tolerances. Furthermore, following operation of the apparatus, when the supply of hot fluid has been shut off, the compressed air is effective to force residual fluid within the cavity back via the outlet apertures to the reservoir.

The body portion may be constructed in any covenient manner, although in a preferred embodiment it comprises inner and outer parts defining there between the annular cavity and each including flow passages for the transfer of hot fluid to the cavity. The inner part may conveniently be divided into a number of segments which are longitudinally spaced so as to define there between radial flow passages extending between a longitudinally extending inlet passage and the annular cavity.

The invention also provides a method of heating a plastic tube, pipe or the like including introducing the part thereof to be heated into an annular cavity and passing hot fluid through said cavity in intimate contact with said part of the pipe disposed therein.

A preferred embodiment of the invention will now be described, by way of example only, with reference to the accompanying drawings, wherein.

Figure 1:
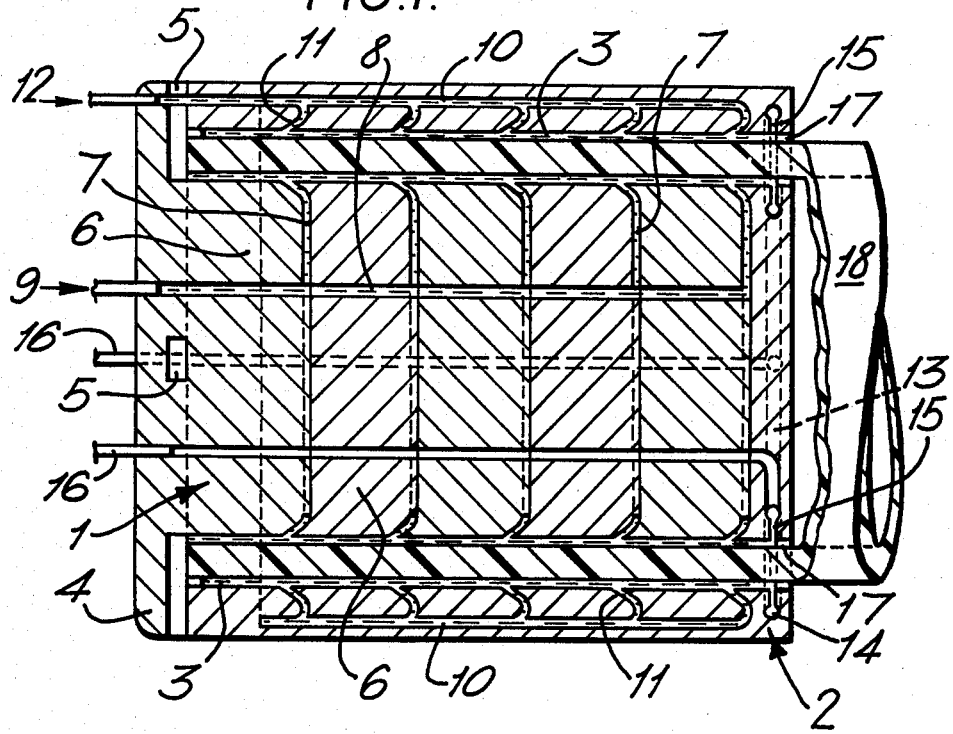
FIG. 1 is a side elevation, in section, of heating apparatus in accordance with the invention.
Figure 2:
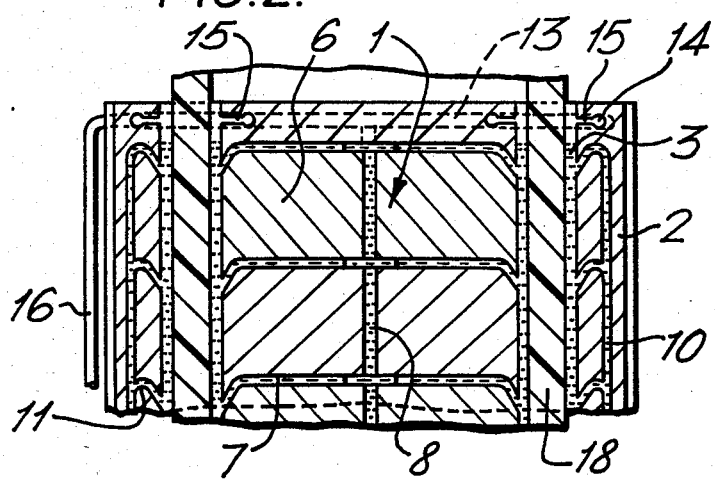
FIG. 2 is a horizontal section through the front part of the apparatus taken along the line II—II in FIG. 3.

Referring to the drawings, apparatus for heating a plastic pipe, tube or the like comprises a body portion including an inner part 1 and a cylindrical outer part 2 which define there between an annular cavity 3. The cavity 3 is closed at one end by means of a flange 4, the flange 4 being recessed at a number points around its perphery to define outlet openings 5.

The inner part 1 comprises a plurality of segments 6 which are spaced apart so as to define longitudinally spaced lateral flow passes 7 there between which communicate with the inner surface of the annular cavity 3 and with a longitudinal flow passage 8 such that hot fluid from a suitable reservoir may be supplied to the cavity 3 from a first inlet 9. The outer, cylindrical part 2 includes an annular flow passage 10 which communicates via lateral flow passages 11 with the outer wall of the cavity 3 such that hot fluid may be supplied to the cavity from a second inlet 12.

At the front end of the inner and outer parts are formed respective annular passages 13, 14 which communicate with the cavity 3 via a plurality of radial ports 15 such that compressed air may be supplied to the front of the cavity from inlet lines 16.

Figure 3:
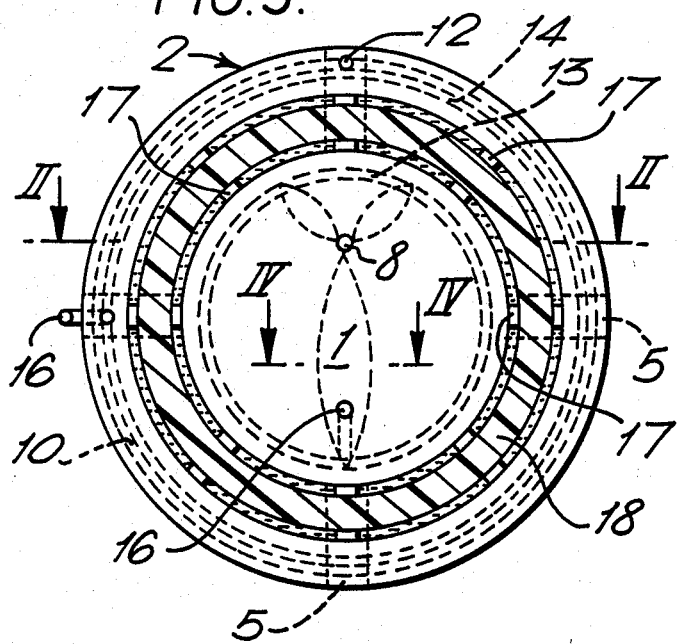
FIG. 3 is a vertical section through the apparatus.
Figure 4:
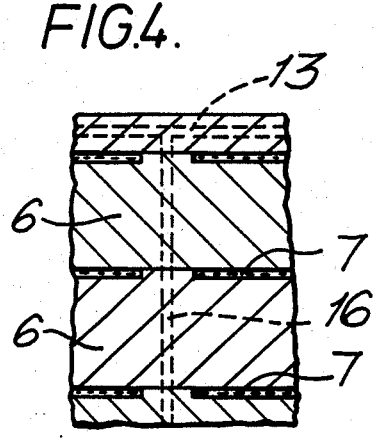
FIG. 4 is a horizontal section through the front part of the apparatus taken along line IV—IV in FIG. 3.

In use of the apparatus, the end portion of a pipe 18 is introduced into the cavity, and compressed air is supplied to the lines 16. As shown in FIGS. 1 and 3, locating elements 17 may be provided to ensure that the pipe is correctly seated. Hot liquid, in the form of oil, is then pumped into the cavity 3 via inlets 9 and 12, the oil being evenly distributed around the inner and outer surfaces of the pipe by virtue of the spaced flow passages 7, 11, and flowing leftwardly through the cavity as shown in FIG. 1 to the outlet apertures 5 from where it may be recirculated to a reservoir.

The compressed air supplied to the radial ports 15 is effective to prevent oil flowing rightwardly from the apparatus. When the pipe has been heated sufficiently for moulding purposes the oil supply to the inlets 9, 12 is shut off, and the pipe is removed from the apparatus. The compressed air supply is maintained during and after removal of the pipe such that any residual oil is forced out of the cavity via the outlet openings 5, and oil is also prevented from dripping out of the passages 7 and 11.

Two such devices may be used in tandom, whereby a pipe heated by a first device is moulded while another pipe is heating in the second device; thus, moulding may be carried out continuously of pipes heated by the alternate devices.

I claim:

1. Heating apparatus for heating the terminal portion of a plastic tube having an inner wall and an outer wall, the apparatus comprising a body having therein an annular cavity adapted to receive the terminal portion of the tube, the cavity being defined by a pair of longitudinally extending, radially spaced walls and having a closed end and an open end through which the tube terminal portion can be passed into the cavity, hot fluid inlet means communicable with a source of hot fluid, hot fluid outlet means adjacent the closed end of the cavity, means for causing the hot fluid to pass into the cavity through said inlet means and to flow through the cavity away from said open end towards said closed end in intimate heating contact with the inner and outer walls of the tube terminal portion, and sealing means adjacent the open end of the cavity, the sealing means comprising gas ducts in both the inner and outer walls of the cavity and communicating with a source of pressurised gas, the gas ducts being arranged to direct the gas towards the inner and outer walls of the tube terminal portion so as to prevent escape of the hot fluid from the open end of the cavity between the walls of the cavity and the walls of the tube terminal portion.

2. Heating apparatus as claimed in claim 1, wherein the inlet means comprises a plurality of radial fluid flow passages at spaced intervals along both longitudinal walls of the cavity, each of said passages having a terminal portion communicating with the cavity and pointing in a direction to assist flow of the hot fluid towards the outlet means adjacent said closed end.

3. Heating apparatus as claimed in claim 1, wherein the hot fluid is a liquid.

4. Heating apparatus as claimed in claim 3, wherein the liquid is oil.

5. Heating apparatus as claimed in claim 1, wherein the pressurised gas is compressed air.

6. A method of heating the terminal portion of a plastic tube by using hot fluid, the tube terminal portion having an inner wall and an outer wall, the method comprising introducing the terminal portion to be heated into an open end of an annular cavity defined by a pair of longitudinally extending, radially spaced walls, sealing said open end against escape of hot fluid by directing pressurised gas into the cavity against both the inner and the outer walls of the tube terminal portion via ducts provided in both said radially spaced cavity walls adjacent the open end of the cavity, introducing hot fluid into said cavity adjacent both the inner and the outer walls of the tube terminal portion, and passing said fluid through said cavity in a direction away from said open end of the cavity towards a closed end thereof adjacent which fluid outlet means is provided, thereby placing the hot fluid in intimate heating contact with the inner and outer walls of the tube terminal portion while the fluid passes through the cavity.

7. A method as claimed in claim 6, wherein said hot fluid is a liquid.

8. A method as claimed in claim 7, wherein the liquid is oil.

9. A method as claimed in claim 7, including removing the tube terminal portion from the cavity after it has been sufficiently heated, and continuing to direct gas into the cavity during such removal so as to force any residual liquid out of the cavity via said outlet means, thereby preventing escape of liquid through said open ends during removal.

* * * * *